US008745376B2

(12) United States Patent
Zaverucha

(10) Patent No.: US 8,745,376 B2
(45) Date of Patent: Jun. 3, 2014

(54) VERIFYING IMPLICIT CERTIFICATES AND DIGITAL SIGNATURES

(75) Inventor: Gregory Marc Zaverucha, Mississauga (CA)

(73) Assignee: Certicom Corp., Mississauga, Ontario (CA)

( * ) Notice: Subject to any disclaimer, the term of this patent is extended or adjusted under 35 U.S.C. 154(b) by 188 days.

(21) Appl. No.: 13/273,503

(22) Filed: Oct. 14, 2011

(65) Prior Publication Data
US 2013/0097420 A1    Apr. 18, 2013

(51) Int. Cl.
*H04L 29/06* (2006.01)
*H04L 9/30* (2006.01)
*H04L 9/32* (2006.01)

(52) U.S. Cl.
CPC ............ *H04L 9/3066* (2013.01); *H04L 9/3242* (2013.01); *H04L 9/3247* (2013.01)
USPC ........................................................ 713/156

(58) Field of Classification Search
CPC .... H04L 9/3242; H04L 9/3066; H04L 9/3247
USPC ........................................................ 713/156
See application file for complete search history.

(56) References Cited

U.S. PATENT DOCUMENTS

| 4,519,036 A | 5/1985  | Green           |
| 4,745,568 A | 5/1988  | Onyszchuk et al.|
| 4,748,668 A | 5/1988  | Shamir et al.   |
| 4,890,323 A | 12/1989 | Beker et al.    |
| 4,989,171 A | 1/1991  | Hollmann        |
| 5,146,500 A | 9/1992  | Maurer          |
| 5,150,411 A | 9/1992  | Maurer          |
| 5,159,632 A | 10/1992 | Crandall        |
| 5,202,995 A | 4/1993  | O'Brien         |
| 5,218,637 A | 6/1993  | Angebaud et al. |
| 5,271,061 A | 12/1993 | Crandall        |
| 5,272,755 A | 12/1993 | Miyaji et al.   |

(Continued)

FOREIGN PATENT DOCUMENTS

| EP | 0588339  | 3/1994 |
| FR | 2536928  | 6/1984 |

(Continued)

OTHER PUBLICATIONS

"Standards for Efficient Cryptography—SEC 1: Elliptic Curve Cryptography," Version 2.0, dated May 21, 2009, Certicom Research, 144 pages.

(Continued)

*Primary Examiner* — Linglan Edwards
*Assistant Examiner* — Lawrence Cosby
(74) *Attorney, Agent, or Firm* — Fish & Richardson P.C.

(57) ABSTRACT

Methods, systems, and computer programs for verifying a digital signature are disclosed. The verifier accesses an implicit certificate and a digital signature provided by the signer. The implicit certificate includes a first elliptic curve point representing a public key reconstruction value of the signer. The verifier accesses a second elliptic curve point representing a pre-computed multiple of the certificate authority's public key. The verifier uses the first elliptic curve point and the second elliptic curve point to verify the digital signature. The verifier may also use a third elliptic curve point representing a pre-computed multiple of a generator point. Verifying the digital signature may provide verification that the implicit certificate is valid.

17 Claims, 5 Drawing Sheets

(56) References Cited

U.S. PATENT DOCUMENTS

| | | | |
|---|---|---|---|
| 5,351,297 | A | 9/1994 | Miyaji et al. |
| 5,373,560 | A | 12/1994 | Schlafly |
| 5,442,707 | A | 8/1995 | Miyaji et al. |
| 5,463,690 | A | 10/1995 | Crandall |
| 5,497,423 | A | 3/1996 | Miyaji |
| 5,511,198 | A | 4/1996 | Hotta |
| 5,524,222 | A | 6/1996 | Hervin |
| 5,627,893 | A | 5/1997 | Demytko |
| 5,650,948 | A | 7/1997 | Gafter |
| 5,675,645 | A | 10/1997 | Schwartz et al. |
| 5,757,918 | A | 5/1998 | Hopkins |
| 5,761,305 | A | 6/1998 | Vanstone et al. |
| 5,764,772 | A | 6/1998 | Kaufman et al. |
| 5,768,389 | A | 6/1998 | Ishii |
| 5,778,069 | A | 7/1998 | Thomlinson et al. |
| 5,825,880 | A | 10/1998 | Sudia et al. |
| 5,889,865 | A | 3/1999 | Vanstone et al. |
| 5,892,899 | A | 4/1999 | Aucsmith et al. |
| 5,896,455 | A | 4/1999 | Vanstone et al. |
| 5,937,066 | A | 8/1999 | Gennaro et al. |
| 5,987,131 | A | 11/1999 | Clapp |
| 5,999,626 | A | 12/1999 | Mullin et al. |
| 6,122,736 | A | 9/2000 | Vanstone et al. |
| 6,141,420 | A | 10/2000 | Vanstone et al. |
| 6,212,279 | B1 | 4/2001 | Reiter et al. |
| 6,243,467 | B1 | 6/2001 | Reiter et al. |
| 6,279,110 | B1 | 8/2001 | Johnson et al. |
| 6,298,135 | B1 | 10/2001 | Messerges et al. |
| 6,304,658 | B1 | 10/2001 | Kocher et al. |
| 6,334,189 | B1 | 12/2001 | Granger et al. |
| 6,411,715 | B1 | 6/2002 | Liskov et al. |
| 6,419,159 | B1 | 7/2002 | Odinak |
| 6,430,588 | B1 | 8/2002 | Kobayashi et al. |
| 6,446,207 | B1 | 9/2002 | Vanstone et al. |
| 6,496,929 | B2 | 12/2002 | Lenstra |
| 6,724,894 | B1 | 4/2004 | Singer |
| 6,816,594 | B1 | 11/2004 | Okeya |
| 6,829,356 | B1 | 12/2004 | Ford |
| 6,873,706 | B1 | 3/2005 | Miyazaki et al. |
| 7,110,538 | B2 | 9/2006 | Gallant et al. |
| 7,127,063 | B2 | 10/2006 | Lambert et al. |
| 7,215,780 | B2 | 5/2007 | Lambert et al. |
| 7,421,074 | B2 | 9/2008 | Jin et al. |
| 7,486,789 | B2 | 2/2009 | Futa et al. |
| 7,599,491 | B2 | 10/2009 | Lambert |
| 7,613,660 | B2 | 11/2009 | Pintsov |
| 2001/0053220 | A1 | 12/2001 | Kocher et al. |
| 2002/0044649 | A1* | 4/2002 | Gallant et al. ............ 380/30 |
| 2002/0057796 | A1* | 5/2002 | Lambert et al. .......... 380/28 |
| 2002/0166058 | A1 | 11/2002 | Fueki |
| 2003/0021410 | A1 | 1/2003 | Miyazaki et al. |
| 2003/0044003 | A1 | 3/2003 | Chari et al. |
| 2003/0048903 | A1 | 3/2003 | Ito et al. |
| 2003/0059042 | A1 | 3/2003 | Okeya et al. |
| 2003/0059043 | A1 | 3/2003 | Okeya et al. |
| 2003/0061498 | A1 | 3/2003 | Drexler et al. |
| 2003/0142820 | A1* | 7/2003 | Futa et al. ............... 380/30 |
| 2005/0114651 | A1* | 5/2005 | Qu et al. ................ 713/156 |
| 2005/0135606 | A1 | 6/2005 | Brown |
| 2007/0064932 | A1* | 3/2007 | Struik et al. ............ 380/30 |
| 2007/0189527 | A1* | 8/2007 | Brown et al. ............ 380/44 |
| 2009/0046852 | A1* | 2/2009 | Vanstone ................ 380/30 |
| 2010/0023117 | A1* | 1/2010 | Yoganathan et al. .... 623/2.11 |
| 2010/0023771 | A1* | 1/2010 | Struik .................... 713/171 |
| 2011/0107097 | A1* | 5/2011 | Braun et al. ............. 713/168 |

FOREIGN PATENT DOCUMENTS

| | | |
|---|---|---|
| FR | 2672402 | 8/1992 |
| JP | 2002328602 | 11/2002 |
| JP | 2004163687 | 6/2004 |
| WO | 91016691 | 10/1991 |
| WO | 9800771 | 1/1998 |
| WO | 9852319 | 11/1998 |
| WO | 0042733 | 7/2000 |

OTHER PUBLICATIONS

"Standards for Efficient Cryptography—SEC 4: Elliptic Curve Qu-Vanstone Implicit Certificate Scheme (ECQV)," Version 0.97, dated Mar. 9, 2011, Certicom Research, 32 pages.

Bernstein, D., "Pippenger's Exponentiation Algorithm," Draft Manuscript dated 2002. Accessed online at: http://cr.yp.to/papers/pippenger.pdf, 21 pages.

Antipa, et al. "Accelerated Verification of ECDSA Signatures." Proceedings of Selected Areas in Cryptography 2006 (SAC'06), LNCS 3897 (2006), pp. 307-318.

Nguyen et al.; "Low-Dimensional Lattice-Basis Reduction Revisited"; ACM Transactions on Algorithms; vol. 5, No. 4, Article 46; Oct. 2009; 48 pages.

ANSI X9.62-1998, Public Key Cryptography for the Financial Services Industry: The Elliptic Curve Digital Signature Algorithm (ECDSA), American National Standard for Financial Services, American Bankers Association, Jan. 7, 1999; 195 pages.

ANSI X9.92-2002., Public-Key Cryptography for the Financial Services Industry: Digital Signature Algorithms Providing Partial Message Recovery: Part 1: Elliptic Curve Pintsov-Vanstone Signatures (ECPVS); Draft American National Standard; 2002; 65 pages.

Bleichenbacher; "Compressing Rabin Signatures"; Lecture Notes in Computer Science; Springer, Berlin; 2004; pp. 124-126; ISBN 3-540-20996-4.

Cheon, J.H. et al.; "Two Efficient Algorithms for Arithmetic of Elliptic Curves Using Frobenius Map"; Public Key Cryptography; First International Workshop on Practice and Theory in Public Key Cryptography—PCK 98; 1998; pp. 195-202.

Ciet, M. et al.; "Improved Algorithms for Efficient Arithmetic on Elliptic Curves Using Fast Endomorphisms"; Advances in Cryptology—Eurocrypt; International Conference on Theory and Application of Cryptographic Techniques; May 4, 2003; pp. 388-400.

Cohen, Henry, A Course in Computational Algebraic Number Theory, Springer, 1993, ISBN 0-387-55640-0; pp. 83-96.

Deitel, H.M. et al., "C++ How to Program", 1994, Prentice-Hall, pp. 58-62.

Dirichlet,G.L., 'Verallgemeinerung eines Satzes aus der Lehrere von Kettenbr-üchen nebst einigen Anwendungen auf die Theorie der Zahlen,' Berichtüber die zur Bekanntmachung geeigneter Verhandlungen der Königlich. Preussischen Akademie der Wissenschaften zu Berlin, 1842; 4 pages; Certification and English translation "Report Concerning the Negotiations of the Royal Prussian Academy of Sciences at Berlin Suitable to be Announced", 1842; 5 pages.

Gallant, R., R. Lambert, S.A. Vanstone, 'Fast Point Multiplication on Elliptic Curves with Efficient Endomorphisms,' in Proceedings of Advances in Cryptology—CRYPTO 2001, Lecture Notes in Computer Science, vol. 2139, pp. 190-200, 2001.

Hankerson, Darrel et al.; "Guide to Elliptic Curve Cryptography"; ISBN 0-387-95273-X; 2004; 332 pages.

Hardy, G.H., E.M. Wright, An Introduction to the Theory of Numbers, Fifth Edition, Oxford: Oxford University Press, 2000; pp. 169-170.

IEEE P1363a Draft 12; Jul. 16, 2003; 177 pages.

Johnson, D. et al.; "The Elliptic Curve Digital Signature Algorithm (ECDSA)"; Certicom Corporation White Paper; 2001; pp. 2-56.

D.J. Johnson, A.J. Menezes, S.A. Vanstone, 'The Elliptic Curve Digital Signature Algorithm (ECDSA),' International Journal of Information Security, vol. 1, pp. 36-63, 2001.

Kelsy, J. et al.; "Side Channel Cryptanalysis of Product Ciphers"; Journal of Computer Security 8; 2000,; pp. 141-158.

Koblitz, Neal; "CM-Curves with Good Cryptographic Properties"; Advances in Cryptography—CRYPTO '91; 1991; pp. 279-287.

Koblitz, Neal; "Elliptic Curve Cryptosystems"; Mathematics of Computation,; vol. 48, No. 177; 1987; pp. 203-209.

Kocher, P. et al.; "Differential Power Analysis"; Advances in Cryptology-CRYPTO '99; Proceedings of the 19th Annual International Cryptology Conference; 1999; pp. 388-397.

(56) References Cited

OTHER PUBLICATIONS

Kocher, P. et al.; "Introduction to Differential Power Analysis and Related Attacks"; Cryptography Research; 1998, 5 pages.

Kocher, Paul C.; "Timing Attacks on Implementations of Diffie-Hellman, RSA, DSS, and Other Systems", Advances in Cryptology-CRYPTO '96; Proceedings of the 16th Annual International Cryptology Conference; vol. 1109; 1996; pp. 104-113.

Koyama, K. et al.; "Elliptic Curve Cryptosystems and Their Applications"; IEICE Transactions on Information and Systems; vol. E75-D, No. 1; 1992; pp. 50-57.

Lercier, R.; "Finding Good Random Elliptic Curves for Cryptosystems Defined over Finite Fields"; Advances in Cryptography—EUROCRYPT '97; vol. 1233; 1997; pp. 379-392.

Lov'asz, L., 'An Algorithmic Theory of Numbers, Graphs and Convexity,' CBMSNSF Regional Conference Series in Applied Mathematics, Band 50, SIAM Publications, 1986; 98 pages.

Menezes, A. et al.; "The Implementation of Elliptic Curve Cryptosystems" of "Lecture Notes in Computer Science"; Advances in Cryptology-AUSCRYPT '90; International Conference on Cryptology; vol. 453; 1990; 14 pages.

Menezes, Alfred; "Elliptic Curve Cryptosystems"; A thesis presented to the University of Waterloo; 1992; pp. 1-121.

Menezes, Alfred. J.; "Handbook of Applied Cryptography"; CRC Press; 1997; pp. 613, 614, 618.

Miller, Victor C.; "Use of Elliptic Curves in Cryptography"; CRYPTO '85; LNCS 218; 1985; pp. 417-426.

Miyaji, A.; "Elliptic Curves Suitable for Cryptosystems"; IEICE Transactions on Fundamentals of Electronics, Communications and Computer Sciences; vol. E77-A, No. 1; 1994; pp. 98-104.

Moller, Bodo; "Algorithms for Multi-Exponentiation"; Selected Areas in Cryptography-SAC 2001; LNCS 2259; pp. 165-180.

Mueller, Volker; "Fast Multiplication on Elliptic Curves over Small Fields of Characteristic Two"; Submitted to Journal of Cryptology; 1997; pp. 1-19.

Nguyen, P., D. Stehré, 'Low-Dimensional Lattice-Basis Reduction Revisited,' in Proceedings of Algorithmic No. Theory—ANTS VI, Lecture Notes in Computer Science, vol. 3076, pp. 338-357, 2004.

Park, Y-H. et al.; "An Alternate Decomposition of an Integer for Faster Point Multiplication on Certain Elliptic Curves"; Proceedings of the 5th Internaitonal Workshop on Practice and Theory in Public Key Cryptosystems; Jan. 1, 2002; pp. 323-334.

Sakai, Y, et al.; "Algorithms for Efficient Simultaneous Elliptic Scalar Multiplication with Reduces Joint Hamming Weight Representation of Scalars"; Proceedings of the 5th Internaitonal Conference on Information Security; Sep. 30, 2002; pp. 484-499.

Schnorr, C.P.; "Efficient Signature Generation by Smart Cards"; Journal of Cryptology; vol. 4, No. 3; 1991; pp. 161-174.

Solinas, J., 'Low-Weight Binary Representations for Pairs of Integers,' Centre for Applied Cryptographic Research, Ow 2001-41, University of Waterloo, Ontario, Canada, 2001; 24 pages.

Solinas, Jerome A.; "An Improved Algorithm for Arithmetic on a Family of Elliptic Curves" of "Lecture Notes in Computer Science"; Advances in Cryptology—CRYPTO '97; 17th Annual International Cryptology Conference; 1997; pp. 357-371.

Solinas, Jerome A.; "Improved Algorithms for Arithmetic on Anomalous Binary Curves"; Technical Report; 1999; 69 pages.

U.S. Department of Commerce/National Institute of Standards and Technology; Federal Information Processing Standards Publication (FIPS PUB 180-2); "Secure Hash Standard"; Aug. 1, 2002; 75 pages.

U.S. Department of Commerce/National Institute of Standards and Technology; Federal Information Processing Standards Publication (FIPS PUB 186-2); "Digital Signature Standard (DSS)"; Jan. 27, 2000; 76 pages.

Waleffe, D. et al.; "CORSAIR: A Smart Card for Public Key Cryptosystems", Advances in Cryptology—CRYPTO '90; 1990; pp. 502-513.

Wang, C. et al.; "VLSI Architectures for Computing Multiplications and Inverses in GF (2m)"; IEEE Transactions on Computers; vol. C-34, No. 8; 1985; pp. 709-717.

Website: http://cr.yp.to/sigs.compress.html; publication date of website: unknown; retrieved on Jul. 15, 2009.

Wharton, John; "An Introduction to the Intel-MCS-51 Single-Chip Microcomputer Family"; Intel Corporation; Intel Application No. AP-69; 1980; 30 pages.

Yen, S.M, et al.; "Multi-Exponentiation"; IEEE Proceedings Comput. Digit. Tech.; vol. 141, No. 6; 1994; pp. 325-326.

\* cited by examiner

US 8,745,376 B2

VERIFYING IMPLICIT CERTIFICATES AND DIGITAL SIGNATURES

BACKGROUND

This specification relates to verifying signatures in a cryptography system. Cryptography systems enable secure communication over public channels. For example, digital signature schemes can be implemented in a public key cryptography system. In some cryptography systems, users verify the authenticity of other users' digital signatures based on certificates issued by a trusted third party.

BRIEF DESCRIPTION OF THE DRAWINGS

Like reference numbers and designations in the various drawings indicate like elements.

DETAILED DESCRIPTION

Techniques for verifying a digital signature and an implicit certificate are presented in this disclosure. In many instances, an Elliptic Curve Digital Signature Algorithm (ECDSA) signature may be sent with an implicit certificate such as an Elliptic Curve Qu-Vanstone (ECQV) certificate. The sum of individual computation cost for verifying the ECDSA signatures and the ECQV certificate may be significant, and a joint operation for simultaneous verification for the both may require less total time or computation resources. The disclosed verification techniques provide an example of such a joint operation. Moreover, the verification techniques disclosed here can be used with other types of digital signature schemes and digital certificate schemes, such as, for example, other types of Elliptic Curve Cryptography (ECC)-based systems.

Figure 1:
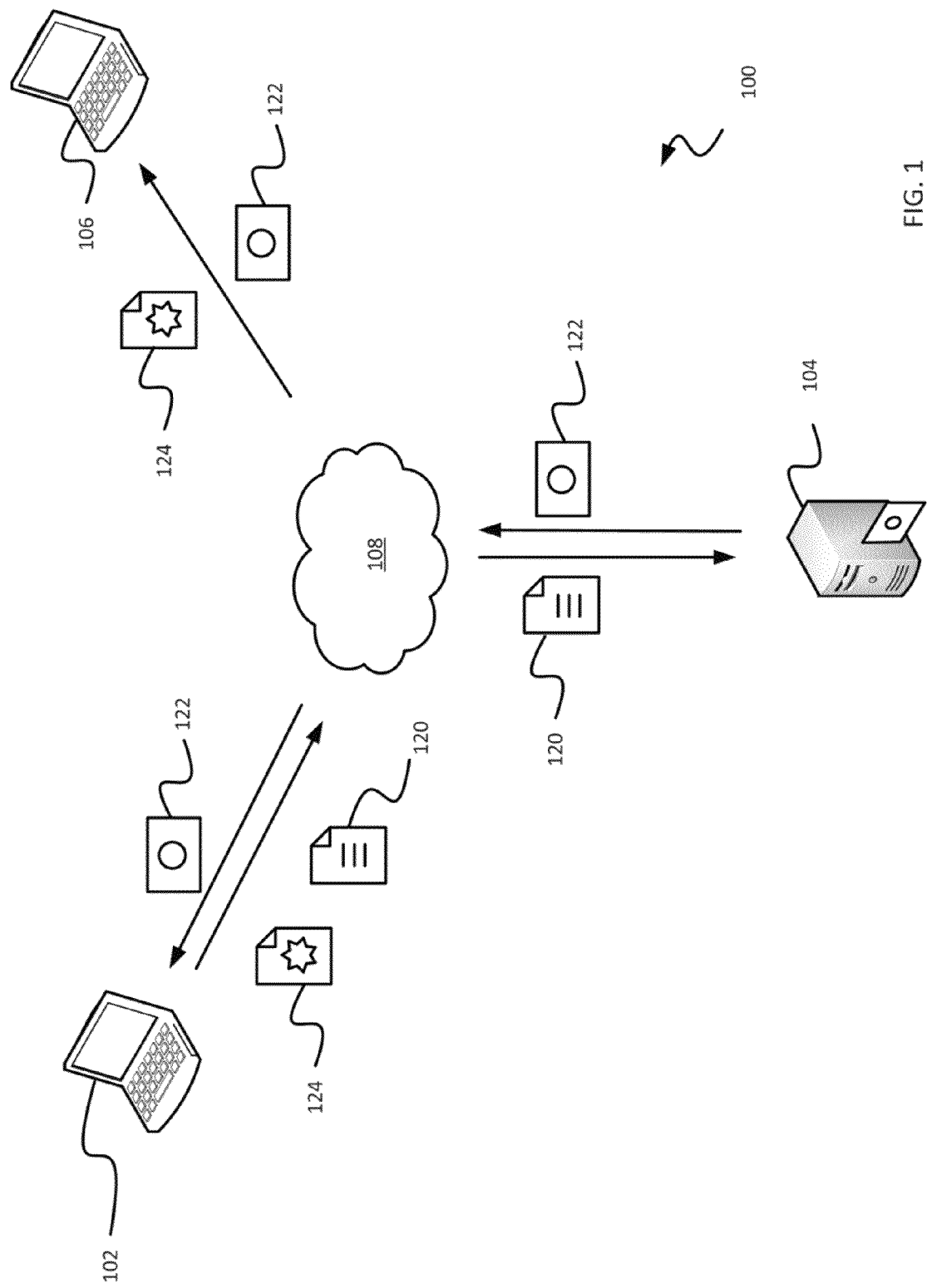
FIG. 1 is a schematic diagram of an example data communication system.

FIG. 1 is a schematic diagram of an example data communication system 100. The data communication system 100 includes a certificate authority server 104, two terminals 102, 106, and a data network 108. The data communication system 100 can include additional, fewer, or different components. For example, the data communication system 100 may include additional storage devices, additional servers (including additional certificate authority servers), additional terminals, and other features not shown in the figure.

The certificate authority server 104 and the terminals 102, 106 can communicate with each other and with other components of the data communication system 100 over the data network 108. In the example shown in FIG. 1, the terminal 102 can send a certificate request 120 to the certificate authority server 104, and the certificate authority can respond by sending an implicit certificate 122 to the terminal 102. The terminal 102 can send a signed message 124 to the terminal 106, and the terminal 106 can verify the authenticity of the signed message 124 using the implicit certificate 122 from the certificate server authority 104. The data communication system 100 can support additional or different types of communication. In some implementations, the terminals 102, 106 can also exchange encrypted messages and other types of information with each other, with the certificate authority server 104, and with other components of the data communication system 100.

The certificate authority server 104 is a computing system that can perform operations of a certificate authority in a cryptography system. The certificate authority server 104 is generally operable to receive, transmit, process, and store information associated with the cryptography system. Although FIG. 1 shows a single certificate authority server 104, a certificate authority can be implemented using multiple certificate authority servers 104, including server clusters, as well as additional or different types of computing devices other than servers.

The certificate authority server 104 and the terminals 102, 106 can be implemented as computing devices that generally include a data processing apparatus, a data storage medium, and a data communication interface. The example certificate authority server 104 shown in FIG. 1 can include a processor, a memory, an input/output controller, and other components. The memory can include, for example, a random access memory (RAM), a storage device (e.g., a writable read-only memory (ROM), etc.), a hard disk, or another type of storage medium. A computing device can be preprogrammed or it can be programmed (and reprogrammed) by loading a program from another source (e.g., from a CD-ROM, from another computer device through a data network, or in another manner). The input/output controller can be coupled to input/output devices (e.g., a monitor, a keyboard, etc.) and to the data network 108. The input/output devices receive and transmit data in analog or digital form over communication links such as a serial link, wireless link (e.g., infrared, radio frequency, etc.), parallel link, or another type of link.

The memory of a computing device can store instructions (e.g., computer code) associated with computer applications, programs and computer program modules, and other resources. For example, the memory can store instructions associated with computer program modules shown in FIG. 2. The memory can also store application data and data objects that can be interpreted by applications, programs, modules, or virtual machines. The memory can store additional information, for example, files and instruction associated with an operating system, device drivers, archival data, or other types of information.

The processor of a computing device can execute instructions to generate output data based on data inputs. For example, the processor can run applications and programs by executing or interpreting the software, scripts, functions, executables, and other types of computer program modules. For example, the processor may perform one or more of the operations shown in FIGS. 3 and 4. The input data received by the processor and the output data generated by the processor can be stored in a computer-readable medium, such as the memory or a storage device.

The data network 108 can include any type of data communication network. For example, the data network 108 can include a wireless or wired network, a cellular network, a telecommunications network, an enterprise network, an application-specific public network, a Local Area Network (LAN), a Wide Area Network (WAN), a private network, a public network (such as the Internet), a WiFi network, a network that includes a satellite link, or another type of data communication network. The data network 108 can include a tiered structure defined by firewalls or similar features that implement various levels of security.

The terminals 102, 106 can communicate over the data network 108 based on communication schemes specified by the cryptography system. The terminals 102, 106 are generally operable to receive, transmit, process, and store information. Although FIG. 1 shows two terminals 102, 106, a data communication system 100 may include any number of terminals. The data communication system 100 can include groups or subgroups of terminals that can communicate with each other, but not necessarily with the terminals in other groups or subgroups. In some implementations, each group of terminals can access a certificate authority server and a database of implicit certificates that have been issued by the certificate authority server. The data communication system 100 can include terminals of disparate types, having different types of hardware and software configurations, and in a variety of different locations. In some cases, multiple devices or subsystems can be identified together as a single terminal.

The terminals 102, 106 can be computing devices that include a memory, a data processor, and an input/output controller. A terminal can include user interface devices, for example, a monitor, touchscreen, mouse, or keyboard. The terminals 102, 106 interface with the data network 108. The memory of a terminal can store messages and information associated with the cryptography system. For example, a terminal may store public and private key data, digital certificate data, and other types of information. The memory of the terminal can store instructions (e.g., computer code) associated with computer applications, programs and computer program modules, and other resources. For example, the terminals can store instructions associated with the computer program modules of the terminal modules 202, 206 shown in FIG. 2.

Terminals can include handheld devices such as smart phones, personal digital assistants (PDAs), portable media players, laptops, notebooks, tablets, and others. Terminals can include work stations, mainframes, non-portable computing systems, devices installed in structures, vehicles, and other types of installations. Terminals can include embedded communication devices. For example, the terminals can include messaging devices that are embedded in smart energy meters of a smart energy system. Other types of terminals may also be used.

In one aspect of operation, the terminal 102 sends the certificate request 120 to the certificate authority server 104, and the certificate authority server 104 generates the implicit certificate 122 for the terminal 102. The implicit certificate 122 associates a particular public key value with a particular user entity (e.g., the terminal 102, a user associated with the user terminal 102, a module implemented at the terminal 102, etc.). The terminal 102 receives the implicit certificate 122 from the certificate authority server 104. When the terminal 102 has a message to send to the terminal 106, the terminal 102 generates a digital signature for the message based on the implicit certificate 122. The digital signature can be combined with the message to form the signed message 124, which the terminal 102 sends to the terminal 106. In some implementations, the digital signature and the message are sent separately. The terminal 106 receives the signed message 124, obtains the implicit certificate 122, and verifies the digital signature based on the implicit certificate 122. Implicit certificates can also be used in other types of schemes, for example, encryption schemes.

An implicit certificate scheme implemented by the data communication system 100 allows the terminals 102, 106 to communicate with each other in a secure manner, even when communications on the data network 108 are observable by malicious users. The implicit certificate 122 binds a user entity associated with the terminal 102 to a particular public key value that can be used to verify digital signatures generated by the terminal 102. The terminal 106 can obtain the implicit certificate 122 to verify that the digital signature was generated by the user entity associated with the terminal 102, and not by an impostor. The terminal 106 can also verify that the implicit certificate 122 was generated by a trusted third party at the certificate authority server 104. In this manner, the implicit certificate 122 serves as confirmation by the trusted third party that the signed message 124 was signed by the user entity associated with the terminal 102 and not by an impostor.

The example implicit certificate 122 shown in FIG. 1 includes neither an explicit representation of the public key nor an explicit representation of the certificate authority's digital signature. Thus, in some implementations, the implicit certificate 122 is more compact than some other types of digital certificates. In some cases, the implicit certificate 122 includes a digital signature of the certificate authority that allows user entities, for example a user entity associated with the terminal 106, to verify that the implicit certificate 122 was generated by the trusted certificate authority. The certificate authority can, in some cases, require the user entity to prove knowledge of the user entity's private key. In some cases, the implicit certificate 122 includes an explicit representation of the user's public key.

Instead of explicitly representing the public key of the terminal 102, the example implicit certificate 122 in FIG. 1 includes public key reconstruction data that can be combined with other information (e.g., the certificate authority's public key, etc.) to generate the public key of the user entity associated with the terminal 102. The example implicit certificate 122 is constructed such that successful verification of a digital signature generated by the terminal 102 serves as confirmation that the terminal 102 is in possession of the private key. Thus, according to some implicit certificate schemes, binding of a user entity to its public key and the user entity's knowledge of its private key can be verified in unison during key usage.

Figure 2:
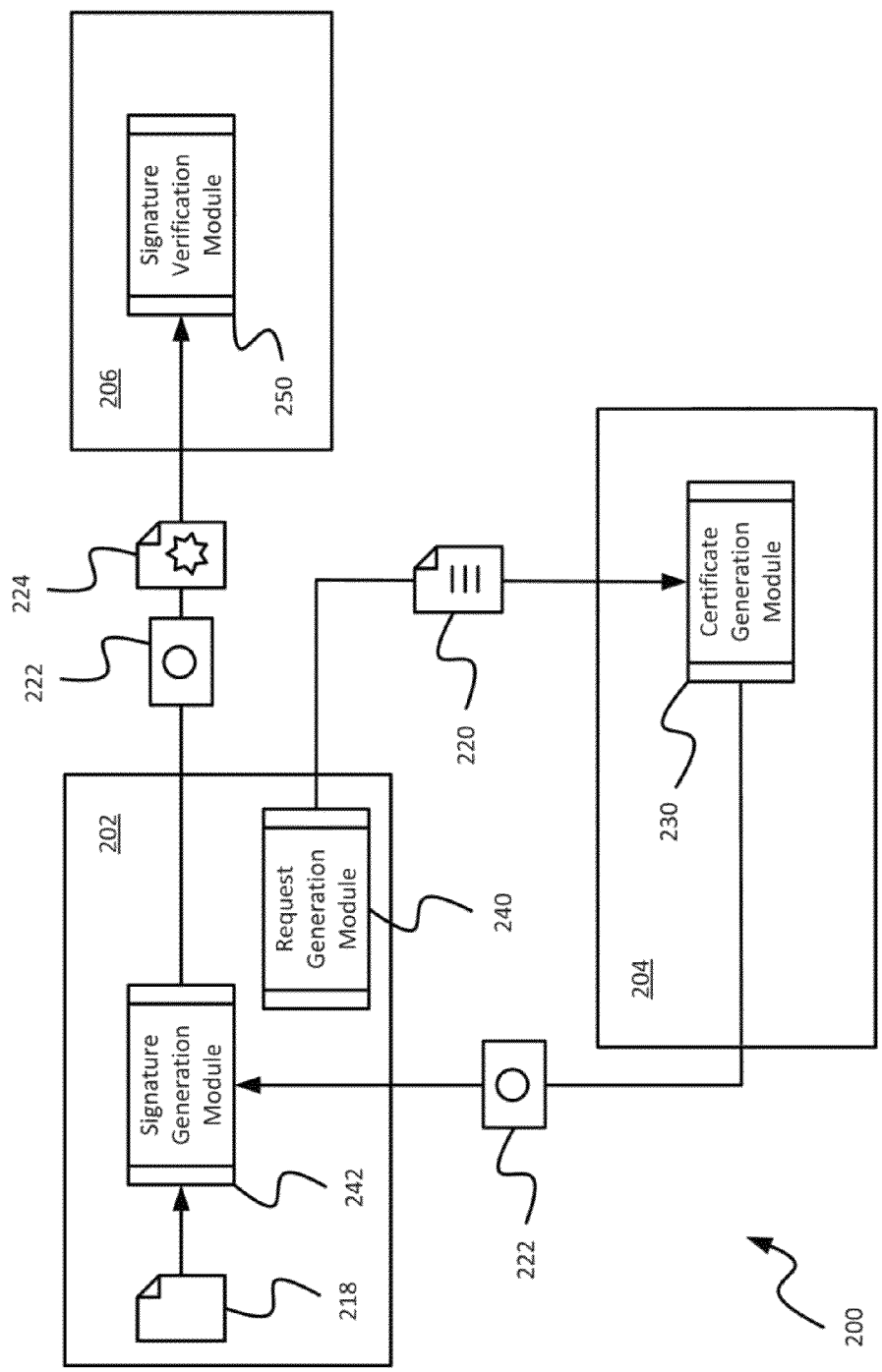
FIG. 2 is a schematic diagram of an example cryptography system.

FIG. 2 is a schematic diagram of an example cryptography system 200 that implements an implicit certificate scheme. The cryptography system 200 includes terminal modules 202, 206, and a certificate authority module 204. The cryptography system 200 can include additional or different components. The terminal modules 202, 206 can each be computer program modules implemented by one or more terminals. For example, the terminal module 202 can be implemented by the terminal 102 of FIG. 1, and the terminal module 206 can be implemented by the terminal 106 of FIG. 1. The certificate authority module 204 can be a computer program module implemented by one or more certificate authority servers. For example, the certificate authority module 204 can be implemented by certificate authority server 104 of FIG. 1.

The terminal modules 202, 206, the certificate authority module 204, and the certificate database 236 can be implemented by additional or different types of hardware systems. For example, the certificate authority module 204, or in some instances individual modules, data, or other aspects of the certificate authority module 204 can be offloaded to non-certificate authority devices. In some instances, for example in a peer-to-peer computing environment, server functionality can be distributed among client devices. As another example, terminal modules, or in some instances individual modules, data, or other aspects of a terminal module, can be provided on a server device, such as a certificate authority server or another type of server.

The terminal modules 202, 206 and the certificate authority module 204 can communicate with each other, for example, over a data network or another type of communication link. In some implementations, the terminal modules 202, 206 and the certificate authority module 204 can communicate with each other by messages transmitted over the data network 108 of FIG. 1. In the example shown in FIG. 2, the terminal module 202 can send a certificate request 220 to the certificate authority module 204. The certificate authority module 204 can receive the certificate request 220 from the terminal module 202 and send an implicit certificate 222 to the terminal module 202 in response to the certificate request 220. The certificate authority module 204 can also send the terminal module 202 private key contribution data. The private key contribution data can be sent to the terminal module 202 together with or separate from the implicit certificate 222. The certificate authority module 204 can also publish the implicit certificate 222, for example, to a certificate database. The terminal module 202 can receive the implicit certificate 222 from the certificate authority module 204 and send a signed message 224 to the terminal module 206. The terminal module 206 can receive the signed message 224 and the implicit certificate 222 from the terminal module 202. The terminal module 206 can verify the digital signature and the implicit certificate 222, for example, using the techniques shown in FIGS. 3 and 4. The cryptography system 200 can support additional or different types of communications.

The cryptography system 200 utilizes an implicit certificate and digital signature scheme that allows the terminal modules to verify the authenticity of messages received from other terminal modules. According to the implicit certificate scheme, implicit certificates issued by the certificate authority bind each user entity to a particular public key value. The ECQV implicit certificate scheme, as well as others, may be implemented using a group of points on an elliptic curve, a multiplicative group of a finite field, or other groups where the discrete logarithm problem may be hard.

Some of the example operations and capabilities of the cryptography system 200 shown in FIG. 2 are described with respect to the ECQV implicit certificate scheme. In some implementations, the ECQV implicit certificate scheme can function as a general purpose digital signature scheme for applications within computer and communications systems. Some implementations of the ECQV implicit certificate scheme are well suited for application environments where resources, such as bandwidth, computing power, and storage are limited. In those cases, ECQV implicit certificates may provide a more efficient alternative to some other types of certificates. Some implementations of the ECQV implicit certificate scheme are well suited for other types of application environments, for example, with superior resources. Examples of elliptic curve-based digital signatures schemes include ECDSA (Elliptic Curve Digital Signature Algorithm), ECPVS (Elliptic Curve Pintsov Vanstone Signatures), and ECNR (Elliptic Curve Nyberg Rueppel).

In an elliptic curve cryptography (ECC) scheme, information is encoded in elliptic curve points in an elliptic curve group. An elliptic curve group can be described in terms of a solution to an equation over a finite field, for example, a prime finite field or a characteristic-two finite field. Each point in the elliptic curve group is a pair of field elements corresponding to a solution to an elliptic curve equation. The elliptic curve group also includes an identity element. As a particular example, let $\mathbb{F}_p$ represent a prime finite field where p is an odd prime number, and let a, b $\in \mathbb{F}_p$ satisfy $4.a^3+27.b^2 \neq 0$ (mod p). The elliptic curve group E ($\mathbb{F}_p$) over $\mathbb{F}_p$, which is defined by the parameters a, b $\in \mathbb{F}_p$ includes the set of points M=(x,y) for x,y $\in \mathbb{F}_p$ that represent a solution to the equation $y^2 \equiv x^3+a.x+b$ (mod p), together with a point $O$ that is the identity element of the elliptic curve group E ($\mathbb{F}_p$). The identity element $O$ is sometimes referred to as the point at infinity.

In an ECC scheme, elliptic curve domain parameters over $\mathbb{F}_p$ can be identified by a sextuple T=(p,a,b,G,n,h). The integer p specifies the finite field $\mathbb{F}_p$. Field elements a, b $\in \mathbb{F}_p$ specify an elliptic curve E($\mathbb{F}_p$) over $\mathbb{F}_p$ as discussed above. The elliptic curve point G=$(x_G, y_G)$ on E($\mathbb{F}_p$) is a base point generator. The integer n specifies the order of the base point generator G, having the property nG=$O$. The cofactor h is equal to #E($\mathbb{F}_p$)/n, which is the number of points on the elliptic curve E($\mathbb{F}_p$) divided by the order of the base point generator G. Elliptic curve domain parameters may alternatively be identified over other types of finite fields. For example, elliptic curve domain parameters over the characteristic two field $\mathbb{F}_{2^m}$ can be identified by a septuple T=(m,f(x),a,b,G,n,h), where m is an integer specifying the finite field $\mathbb{F}_{2^m}$ and f(x) is an irreducible binary polynomial of degree m specifying the representation of $\mathbb{F}_{2^m}$ In some implementations, the elliptic curve domain parameters can be generated, validated, and utilized by the terminal modules 202, 206 or by the certificate authority module 204 in the cryptography system 200. In some implementations, the elliptic curve domain parameters can be shared among the modules in the cryptography system 200.

In an ECC scheme, an elliptic curve key pair (d,Q) can be generated based on valid elliptic curve domain parameters, for example, T=(p,a,b,G,n,h) or T=(m,f(x),a,b,G,n,h). The key pair may be generated by selecting a random integer d in the interval [1,n−1], computing Q=dG, and outputting the key pair (d,Q). The random integer d may be selected or obtained by a random number generator. In some implementations, the elliptic curve key pairs can be generated, validated, and processed by the terminal modules 202, 206 or by the certificate authority module 204 in the cryptography system 200.

The terminal module 202 includes a signature generation module 242, a request generation module 240, and other possibly other modules. The request generation module 240 can generate a certificate request 220. The certificate request 220 can include an identification U of a user entity. The certificate request 220 can include an elliptic curve point $R_U$. The certificate request 220 can include additional or different information. The identification value U can be a unique identifier for a particular user entity, a particular device, or both. The request generation module 240 can generate the elliptic curve point $R_U$ by selecting a random number $k_U$ and computing $R_U = k_U G$. For example, the terminal module 202 may have a random number generator module that generates random numbers. The request generation module 240 can perform a validity check to ensure that the values $k_U$ and $R_U$ correspond to a valid key pair. The requester can convert the elliptic curve point $R_U$, the identification value U, and any other information to be included in the certificate request 220 to an appropriate data format (e.g., an octet string).

The signature generation module 242 can use the implicit certificate 222 to generate a digital signature for a message 218. An example technique for generating a digital signature based on an elliptic curve key pair is provided by the Elliptic Curve Digital Signature Algorithm (ECDSA). The message 218 can include any type of electronic document, data file, data object, or other form of information. In some cases, the message 218 is an e-mail message, an electronic document, or an electronic data file that can be edited and rendered by appropriate software applications. In some cases, the message 218 is a data message or a combination of data messages used in signaling applications among hardware components. For example, the message 218 can include status information from a smart energy meter in a smart energy infrastructure.

The signature generation module 242 can generate the digital signature using the private key of the terminal module 202 and the implicit certificate 222. The signature generation module can generate the private key of the terminal module 202 based on private key contribution data r, the implicit certificate 222, and the random value $k_U$ that was used to generate the certificate request 220. The digital signature generated by the signature generation module 242 can be appended to, combined with, or otherwise associated with the message 218 to create the signed message 224. The digital signature can be sent separately from the message 218. The terminal module 202 can send the implicit certificate 222 to the terminal module 206 along with the signed message 224.

The terminal module 206 includes a signature verification module 250 and possibly other modules. The signature verification module 250 can verify the digital signature associated with the signed message 224. The terminal module 206 can include a data input module that obtains or provides the input values used by the signature verification module 250. Example techniques for verifying a digital signature are provided in FIGS. 3 and 4. Additional or different techniques may be used. The signed message 224 includes a digital signature purportedly generated by a user entity associated with an identification value U. The signature verification module 250 can receive the implicit certificate 222 from the terminal module 206 or retrieve the implicit certificate 222 associated with the identification value U from another source. The signature verification module 250 can verify the authenticity of the digital signature and the validity of implicit certificate 222.

The certificate authority module 204 includes a certificate generation module 230, and possibly other modules. The certificate generation module 230 can perform one or more operations for issuing the implicit certificate 222 for use in the cryptography system 200. For example, the certificate generation module 230 may be configured to perform one or more of the operations presented in FIG. 3A, or the certificate generation module 230 may be configured to issued implicit certificates in a different manner.

The certificate generation module 230 generates the implicit certificate 222 based on the information in the certificate request 220. For example, the certificate generation module 230 can select a random value k and generate public key reconstruction data $P_U$ by computing $P_U = R_U + kG$, where $R_U$ is the elliptic curve point generated by the request generation module 240 and included in the certificate request 220. The certificate authority module 204 may have a random number generator module that generates random numbers. The certificate generation module 230 can encode the public key reconstruction data $P_U$, and sometimes other information, in an implicit certificate $Cert_U$. The implicit certificate $Cert_U$ can be generated by a certificate encoding scheme, for example, a fixed-length field scheme, a minimal ASN.1 encoding scheme, or an X.509-compliant ASN.1 encoding scheme.

Figure 3:
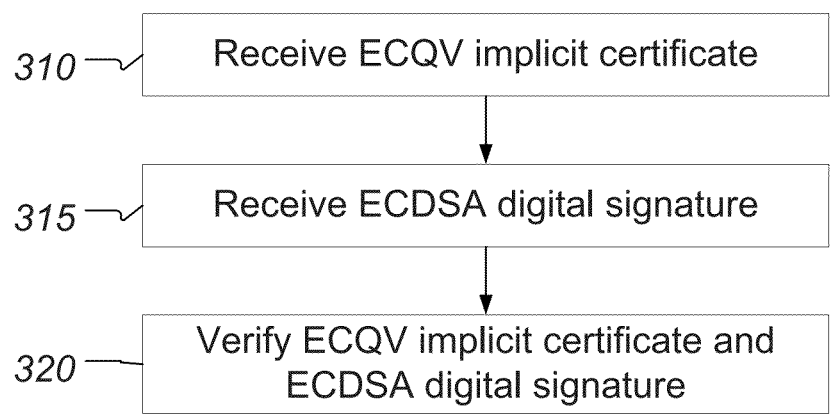
FIG. 3 is a flow chart showing an example verification process.

FIG. 3 is a flow chart showing an example verification process 300. The process 300 can be implemented by a terminal of a cryptography system. For example, the process 300 can be implemented by the terminal 106 shown in FIG. 1, the terminal module 206 shown in FIG. 2, or by another type of system or module. The example process 300 shown in FIG. 3 can be implemented using additional, fewer, or different operations, which can be performed in the order shown or in a different order. In some implementations, one or more of the operations can be repeated or iterated, for example, until a terminating condition is reached. For purposes of illustration, the operations of the example process 300 are described below as implemented by a terminal of an elliptic curve cryptography system. The example process 300 can also be in other types of cryptography systems. Moreover, one or more of the operations of the example process 300 can be implemented by another type of entity in the cryptography such as a certificate authority.

Figure 3A:
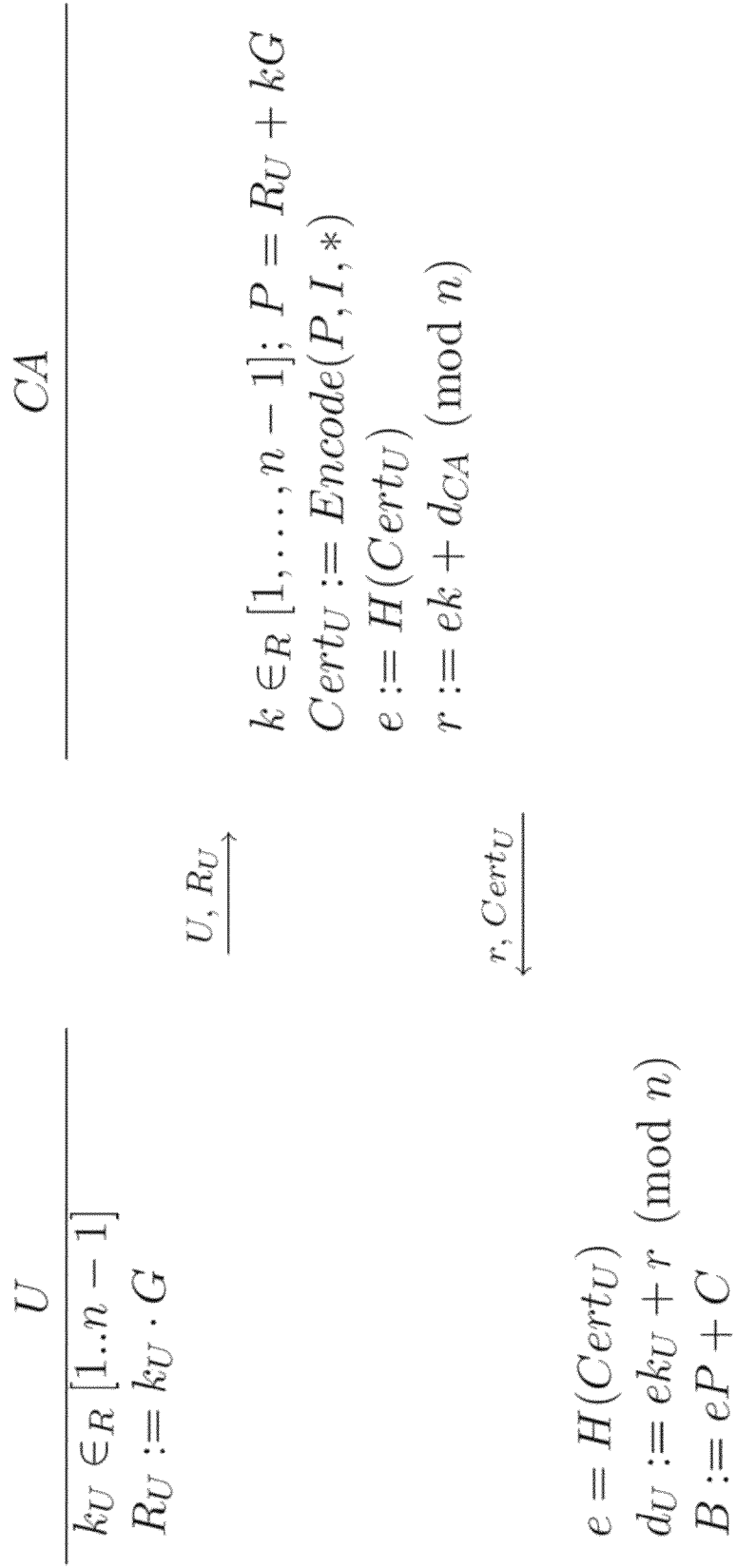
FIG. 3A is a diagram example of certificate issuance protocol.

In some implementations, the process 300 may be used to simultaneously verify an ECQV implicit certificate and an ECDSA digital certificate that is based on the implicit certificate. The ECQV implicit certificate scheme may be described with respect to operations performed by three entities with the following representations—a Certificate Authority CA, a certificate requester U, and a certificate processer V. FIG. 3A shows an example protocol executed by the certificate requester U and the certificate authority CA when the certificate authority CA issues the implicit certificate for the requester U. As shown in FIG. 3A, certificate issuance can include a two pass protocol between the requester U and the certificate authority CA, where the first flow is the certificate request from U, and the second flow is the response from CA, containing the certificate.

In the present discussion of FIGS. 3 and 3A, the following notation is used. G represents a base point operable to generate the group of elliptic curve points used to implement ECQV. The group $\mathbb{G}$ may be of prime order n. C represents the CA's public key, which is a point in the group $\mathbb{G}$ The ECQV implicit certificate can be represented as (P,I), where P represents an elliptic curve point in $\mathbb{G}$ and I is a bit string that may contain information about the requester U. A hash value $e = H(P,I)$ represents the hash of the certificate (P,I). The choice of the hash function H can be fixed, for example, as part of the domain parameters. B represents the requester's public key, according to the equation $B = C + eP$. The value b represents the requester's secret key, and b satisfies the relationship of $B = bG$.

In some implementations, the certificate authority CA or another entity establishes the elliptic curve domain parameters, a hash function, the certificate encoding format, and all parties have selected a random number generator. The certificate authority CA can generate a key pair. All parties can receive authentic copies of CA's public key and domain parameters. The elliptic curve domain parameters, which can be generated by the certificate authority or another entity, include the field size q, the elliptic curve coefficients a and b, the base point generator G, the order n of the base point generator, the cofactor h (where hn is the number of points on the elliptic curve), and others. In some instances, the elliptic curve domain parameters include a seed value for selecting random values. In cases where the field is a characteristic two finite field (i.e., $q = 2^m$), the elliptic curve domain parameters include an indication of the basis (e.g., the reduction polynomial). The hash function H can be a hash function that has been approved for the specified security level in the cryptography system. In some implementations, one or more conventional hash functions in the SHA-2 family can be used (e.g., SHA-256, SHA-512). Additional or different hash functions may be used.

After the requester U receives the implicit certificate from the certificate authority, the requester U can use the implicit certificate. For example, the requester U may use the implicit certificate to generate an ECDSA digital signature. In some implementations, an ECDSA digital signature can be generated based on the following example technique. Let $Q = xG$, where G represents the base point. Q represents the public key and x represents the private key. The hash function H': $\{0, 1\}^* \rightarrow Z_n$ may be the same as the function H used with ECQV, or may be different. The ECDSA signing process may utilize as input a message m and a private key x, and produce as output a signature (r,s). The signing procedure can be summarized as follows: (1.) Choose k$\in_R \mathbb{Z}_n$; (2.) Compute T=kG; (3.) Let r=f(T) where f: $\mathbb{G} \to \mathbb{Z}_n$; (4.) If r=0 then go to step (1.); (5.) Compute h=H'(m); (6.) Compute s=(h+rx)/k (mod n); (7.) If s=0 then go to step (1.); and (8.) return (r,s). Additional or different digital signature techniques may be used.

The requester U may then send the digital signature and the implicit certificate to a verifier V. The requester U may send the implicit certificate with the digital signature, the requester U may send the implicit certificate and the digital signature separately, or the verifier may obtain the implicit certificate from another source. As shown in FIG. 3, an ECQV implicit certificate is received by a verifier V, and at 315, an ECDSA digital signature is received by the verifier V.

At 320, the ECQV implicit certificate and the ECDSA digital signature are verified by the verifier V. A combined fast verification technique can be used for verifying an ECDSA signed message where the signer has an ECQV implicit certificate. For example, the technique can combine the two processes of recovering the signer's ECQV public key and ECDSA. The technique may access inputs that include an ECDSA signed message m, the digital signature (r,s), and an ECQV certificate (P,I). The technique may produce outputs that include reporting "accept" or "reject".

In some aspects, the verification process can be summarized as follows: (1.) Reject if r,s$\in\{1, \ldots q-1\}$; (2.) Reject if P$\in \mathbb{G}$; (3.) Invert the function $f$ to find R$\in \mathbb{G}$ where $f$(R)=r from the ECDSA signing operation, under an assumption that only one such R exists; (4.) Compute h=H'(m), e=H (P,I); (5.) Write (re)/s as u/v (mod n) such that u, v are small integers; (6.) If the equation $$\left(\frac{hv}{s}\right)G + \left(\frac{vr}{s}\right)C + uP - R = O \quad (1)$$

is satisfied, where $O$ is the identity element, then output "accept", else output "reject".

The process of inverting the function $f$ can be efficiently conducted, for example, where the co-factor of the elliptic curve group is small. When the co-factor is one, there can be a single inverse for each r, and when the cofactor is greater than one, but still small, with a few "hint bits", the inversion may be made efficient. In some implementations, (R, s) may be sent as the signature instead of (r=$f$(R), s). Operation (5.) in the verification process outlined above can use the extended Euclidean algorithm to express x(mod n) as a fraction u/v (mod n) such that u,v$\leq\sqrt{n}$.

After R is computed from r, the ECDSA verification equation can check whether the following equation is satisfied:

$$R = \left(\frac{h}{s}\right)G + \left(\frac{r}{s}\right)B$$

where B is the public key. Since B=C+eP, it is mathematically equivalent to check $$R = \left(\frac{h}{s}\right)G + \left(\frac{r}{s}\right)C + \left(\frac{re}{s}\right)P. \quad (2)$$

Further, (re)/s can be substituted with u/v and the equation becomes:

$$R = \left(\frac{h}{s}\right)G + \left(\frac{r}{s}\right)C + \left(\frac{u}{v}\right)P$$

As such, this is mathematically equivalent to the verification equation:

$$\left(\frac{hv}{s}\right)G + \left(\frac{vr}{s}\right)C + uP - R = O$$

The efficiency of the combined verification process can be higher than the sum of calculation in each component. The resulting verification equation can be computed by computing the sum of scalar multiples (sometimes called a "multi scalar multiplication" or MSM). Two of the scalar multiples (base G and C) may have full sized exponents and fixed bases. For example, assuming there is a small number of CAs, pre-processing can be conducted to pre-compute and store multiples of G and C. The other two bases (P and R) may vary with each signer/signature, but here the scalars are half-sized, on account of the choice of u and v.

The verification equation can be rewritten as $$\lambda G + \gamma C + uP - vP = O \quad (3)$$

where $\lambda$=hv/s and $\gamma$=vr/s. Let t=[$\log_2$(n+1)]. Then $$\lambda = \lambda_0 + \lambda_1 2^{\lceil t/2 \rceil}$$

$$\gamma = \gamma_0 + \gamma_1 2^{\lceil t/2 \rceil}$$

for integers $\lambda_0, \lambda_1, \gamma_0, \gamma_1$ that are about t/2 bits long in some instances. The notation $\lceil/2\rceil$ denotes the ceiling of t/2, which refers to the smallest integer not less than t/2. If two points are pre-computed, such as, for example, by computing $G_1 = 2^{\lceil t/2 \rceil}$G and $C_1 = ^{\lceil t/2 \rceil}$C, the verification criterion can be written:

$$\lambda_0 G + \lambda_1 G_1 + \gamma_0 C + \gamma_1 C_1 + uP - vR = O \quad (4)$$

Any suitable technique may be used to implement the scalar multiplications. The form of the verification criterion in Equation (4) uses six scalar multiplications with half-length scalars, compared to three scalar multiplications with full-length scalars in Equation (2). In some implementations, each "half-length" scalar is less than or equal to $\lceil t/2 \rceil$ bits. For example, in some instances, each of the scalars $\lambda_0, \lambda_1, \gamma_0, \gamma_1$, u, v in Equation (4) can be less than or equal to $\lceil t/2 \rceil$ bits. The cost comparison between the Equations (2) and (4) can be reduced to comparing an MSM with three terms and full-length (t-bit) scalars to another MSM with six terms and half-length (t/2-bit) scalars.

Some example algorithms for evaluating the speedup (e.g., the Strauss Algorithm) use (1+p/$\log_2 \log_2$ B) $\log_2$ B group operations, where p is the number of terms in the MSM and the scalars are less than B. Using the Strauss estimate for comparing Equation (2) to Equation (4), when t=384, it is found that Equation (4) generates a 33 percent speedup over Equation (2).

A second estimate can be given, assuming the MSM is implemented using a conventional w-NAF, to facilitate calculation. In Equation (2) two of the three terms are known. In Equation (4) four of the six terms are known in advance. The tables of points used by the NAF algorithm may be pre-computed for the known points. Each table has ($2^w-(-1)^w$)/3 entries, and takes one addition per entry to create. The tables for the unknown points can be computed on-the-fly. The scalars are w-NAF re-encoded, reducing the overall number of additions by about $1/(w+1)$.

Let A be the number of elliptic curve additions and D be the number of doublings required. In this implementation, Equation (2) uses $$[3t/(w+1)+(2^w-(-1)^3)/3]A+[t-1]D$$

additions and doublings, while Equation (4) uses $$[6t/2(w+1)+2(2^w-(-1)^2)/3]A+[(t-1)/2]D$$

additions and doublings. By subtracting these two costs, we can estimate the speedup of Equation 4 to be $$[(t-1)/2]D-[(2^w-(-1)^w)/3]A.$$

We now look at two specific choices of w, namely w=4, 5. When w=4, Equation (2) uses $$[3t/5+5]A+[t-1]D$$

and Equation (4) uses $$[3t/5+10]A+[(t-1)/2]D.$$

Using the estimates, A=10.4M and D=7.2M, where M is the cost of a field multiplication, it can be found that when w=4, and t=384 the estimated speedup is 25.5 percent. When w=5, a similar calculation estimates the speedup to be 26.1 percent. Based on these estimates, combining ECQV and ECDSA verification as in Equation (4) may provide faster verification in some instances.

Figure 4:
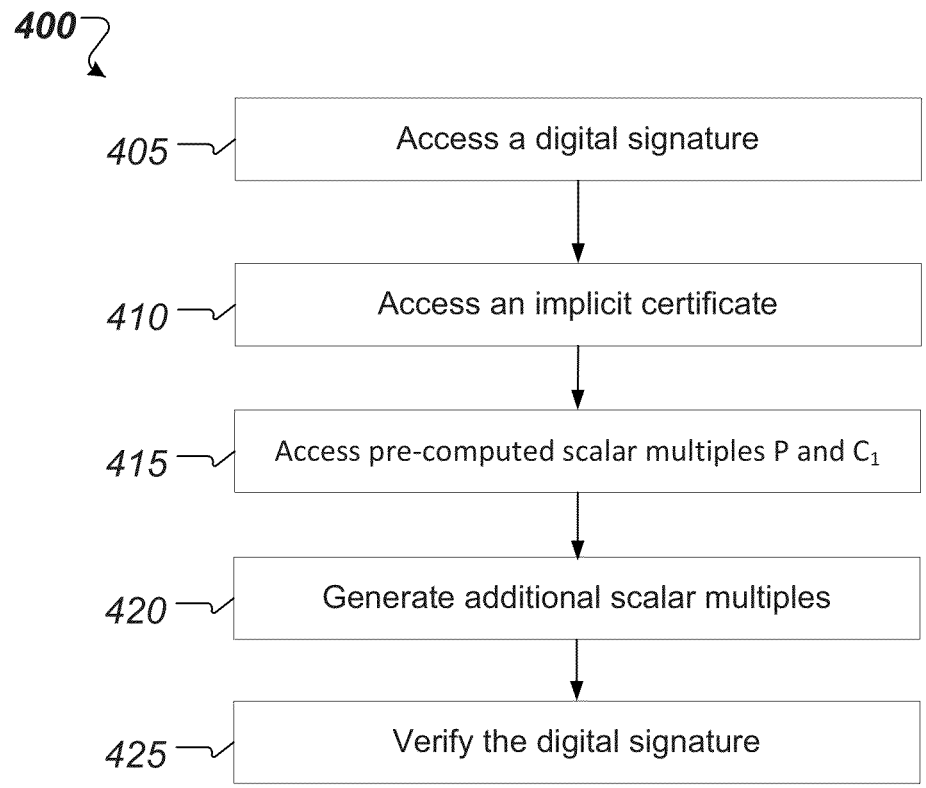
FIG. 4 is a flow chart showing an example process for verifying combined signatures.

FIG. 4 is a flow chart showing an example verification process 400. The verification process 400 can be implemented by any suitable hardware, for example, by a data processing apparatus, a computing device or a system of computing devices. In some instances, the process 400 can be implemented by the terminal 106 shown in FIG. 1, by the terminal module 206 shown in FIG. 2, or by another type of system or module. The example verification process 400 shown in FIG. 4 can be implemented using additional, fewer, or different operations, which can be performed in the order shown or in a different order. In some implementations, one or more of the operations can be repeated or iterated, for example, until a terminating condition is reached. For purposes of illustration, the operations of the example verification process 400 are described below as implemented by a terminal of an elliptic curve cryptography system. For example, the verification process may be used to verify an ECDSA digital signature and an ECQV implicit certificate. The example process 400 can also be used in different types of cryptography systems. Moreover, one or more of the operations of the example process 400 can be implemented by another type of entity in the cryptography such as a certificate authority.

At 405, a digital signature is accessed. For example, the digital signature can be an ECDSA digital signature or another type of ECC-based digital signature. The digital signature may be associated with an entity. For example, the entity can be a user, a computing device, a user account, or another type of entity. The digital signature can be accessed from a local memory, from a remote device, or another source. In some instances, the digital signature is received from the entity.

At 410, an implicit certificate is accessed. For example, the implicit certificate can be an ECQV implicit certificate or another type of ECC-based implicit certificate. The implicit certificate may be issued by a certificate authority and associated with the entity. The implicit certificate can be accessed from a local memory, from a remote device, or another source. In some instances, the digital signature is received from the entity. The implicit certificate may include an elliptic curve point P representing a public key reconstruction value of the entity.

At 415, a second elliptic curve point $C_1$ is accessed. The second elliptic curve point $C_1$ represents a pre-computed multiple of a public key C of the certificate authority. In some instances, the pre-computed multiple of the certificate authority's public key C can be used to verify the digital signature faster. For example, performing an elliptic curve point multiplication can be time-consuming. By calculating and storing certain pre-computed multiples (e.g., prior to receiving a digital signature to be verified), the time required to verify the digital signature may be reduced. The pre-computed multiples can values that are likely to be used to verify digital signatures. For example, the pre-computed multiples can include one or more pre-computed multiples of the certificate authority's public key, one or more pre-computed multiples of the generator point, or any suitable combination of these and other values. Such values can be "pre-computed" by computing them before a particular digital signature is to be verified. The pre-computed multiples can be stored and made accessible to be used when a digital signature is to be verified.

At 420, additional scalar multiples are generated based on a number of half-length scalars and a plurality of elliptic curve points. Each of the scalar multiples may be generated by multiplying one of the half-length scalars by one of the elliptic curve points. The elliptic curve points that are used to produce the scalar multiples may include P, $C_1$ and $G_1$, of which $G_1$ represents a pre-computed multiple of a generator point G. At 425, the digital signature is verified using the first elliptic curve point P and the second elliptic curve point $C_1$. For example, the digital signature can be verified based on the scalar multiples generated at 420, which may include a scalar multiple of the first elliptic curve point P, a scalar multiple of the second elliptic curve point $C_1$, a scalar multiple of the third elliptic curve point $G_1$, or a combination of these and other scalar multiples. In some implementations, the digital signature may be verified at 420 using the example Equation 4 provided above, or by another suitable technique.

Subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on non-transitory computer storage medium for execution by, or to control the operation of, data processing apparatus. Alternatively or in addition, the program instructions can be encoded for transmission to suitable receiver apparatus for execution by a data processing apparatus. A computer storage medium can be, or be included in, a computer-readable storage device, a computer-readable storage substrate, a random or serial access memory array or device, or a combination of one or more of them. The computer storage medium can be, or be included in, one or more separate physical components or media (e.g., multiple cards, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing.

The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computing device or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computing device are a processor for performing actions in accordance with instructions and one or more memory devices for storing instructions and data. Generally, a computing device will also include, or be operatively coupled to receive data from or transfer data to, or both, one or more storage devices for storing data. However, a computing device need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, subject matter described in this specification can be implemented on a computer having a display device, e.g., an LCD (liquid crystal display) screen for displaying information to the user and a keyboard and a pointing device, e.g., touch screen, stylus, mouse, etc. by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computing device can interact with a user by sending documents to and receiving documents from a device that is used by the user; for example, by sending web pages to a web browser on a user's client device in response to requests received from the web browser.

Some of the subject matter described in this specification can be implemented in a computing system that includes a back-end component, e.g., as a data server, or that includes a middleware component, e.g., an application server, or that includes a front-end component, e.g., a client computing device having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a data network.

The computing system can include clients and servers. A client and server are generally remote from each other and typically interact through a data network. The relationship of client and server arises by virtue of computer programs running on the respective computers and having a client-server relationship to each other. In some implementations, a server transmits data to a client device. Data generated at the client device can be received from the client device at the server.

While this specification contains many implementation details, these should not be construed as limitations on the scope of what may be claimed, but rather as descriptions of features specific to some implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In a general aspect, a technique for verifying digital signatures is disclosed. The technique may take an implicit certificate and a digital signature as input. The technique may determine and generate a positive output if the certificate is valid and the signature on the message is valid.

In some aspects, a digital signature associated with an entity is accessed. An implicit certificate issued by a certificate authority and associated with the entity is accessed. The implicit certificate may include a first elliptic curve point P representing a public key reconstruction value of the entity. A second elliptic curve point $C_1$ representing a pre-computed multiple of a public key C of the certificate authority is accessed. The first elliptic curve point P and the second elliptic curve point $C_1$ are used to verify the digital signature by data processing apparatus.

Implementations of these and other aspects can include one or more of the following features. Verifying the digital signature provides verification that the implicit certificate is valid. A third elliptic curve point $G_1$ representing a pre-computed multiple of a generator point G is accessed and the third elliptic curve point $G_1$ is accessed with the first elliptic curve point P and the second elliptic curve point $C_1$ to verify the digital signature.

Additionally or alternatively, implementations of these and other aspects can include one or more of the following features. Verifying the digital signature can include generating a plurality of scalar multiples based on a plurality of half-length scalars and a plurality of elliptic curve points. Each of the scalar multiples is generated by multiplying one of the plurality of half-length scalars by one of the plurality of elliptic curve points. The plurality of elliptic curve points includes the first elliptic curve point P, the second elliptic curve point $C_1$, and the third elliptic curve point $G_1$. Verifying the digital signature can also include combining the plurality of scalar multiples according to a digital signature verification equation.

Additionally or alternatively, implementations of these and other aspects can include one or more of the following features. The digital signature includes a first signature element r and a second signature element s. The generator point G is a generator of an elliptic curve group of order n. Based on the first signature element r, a fourth elliptic curve point R can be obtained. A first integer u and a second integer n are then computed based on the digital signature.

Additionally or alternatively, implementations of these and other aspects can include one or more of the following features. The first integer u and the second integer v are each less than $\sqrt{n}$. A third integer $\lambda_0$ and a fourth integer $\lambda_1$ are then computed such that $\lambda=\lambda_0+\lambda_1 2^{\lceil t/2 \rceil}$, where $t=\lceil \log_2(n+1) \rceil$, $\lambda=hv/s$, and h is a hash of a message m associated with the digital signature (r,s). A fifth integer $\gamma_0$ and a sixth integer $\gamma_1$ can then be computed such that $\gamma=\gamma_0+\gamma_1 2^{\lceil t/2 \rceil}$, where $\gamma=vr/s$. Verifying the digital signature includes verifying $\lambda_0 G+\lambda_0 G_1+\gamma_0 C+\gamma_1 C_1+uP-vR=\mathcal{O}$, where $\mathcal{O}$ represents an identity element of the elliptic curve group.

Additionally or alternatively, implementations of these and other aspects can include one or more of the following features. Prior to accessing the digital signature associated with the entity, the fast verification method may further include computing the second elliptic curve point $C_1=2^{\lceil t/2 \rceil}C$ and computing the third elliptic curve point $G_1=2^{\lceil t/2 \rceil}G$. The second elliptic curve point $C_1$ and the third elliptic curve point $G_1$ may be stored for subsequent access.

Thus, implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method for verifying a digital signature, the method comprising:
   accessing a digital signature associated with an entity, wherein the digital signature includes a first signature element r and a second signature element s;
   accessing a message m associated with the digital signature (r,s);
   accessing an implicit certificate issued by a certificate authority and associated with the entity, the implicit certificate including a first elliptic curve point P representing a public key reconstruction value of the entity;
   accessing a second elliptic curve point $C_1$ representing a pre-computed multiple of a public key C of the certificate authority;
   accessing a third elliptic curve point $G_1$ representing a pre-computed multiple of a generator point G, the generator point G representing a generator of an elliptic curve group of order n;
   obtaining a fourth elliptic curve point R based on the first signature element r;
   computing a first integer u and a second integer v based on the digital signature, wherein the first integer u and the second integer v are each less than $\sqrt{n}$;
   computing a hash h of the message m;
   computing a third integer $\lambda_0$ and a fourth integer $\lambda_1$ such that $\lambda=\lambda_0+\lambda_1 2^{\lceil t/2 \rceil}$, where $t=\lceil \log_2(n+1) \rceil$, $\lambda=hv/s$;
   computing a fifth integer $\gamma_0$ and a sixth integer $\gamma_1$ such that $\gamma=\gamma_0+\gamma_1 2^{\lceil t/2 \rceil}$, where $\gamma=vr/s$;
   verifying that $\lambda_0 G+\lambda_1 G_1+\gamma_0 C+\gamma_1 C_1+uP-vR=\mathcal{O}$ to verify the digital signature by data processing apparatus, where $\mathcal{O}$ represents an identity element of the elliptic curve group.

2. The method of claim 1, comprising:
   generating a plurality of scalar multiples based on a plurality of half-length scalars and a plurality of elliptic curve points, wherein each of the scalar multiples is generated by multiplying one of the plurality of half-length scalars by one of the plurality of elliptic curve points, and the plurality of elliptic curve points includes the first elliptic curve point P and the second elliptic curve point $C_1$,
   wherein verifying the digital signature includes combining the plurality of scalar multiples according to a digital signature verification equation.

3. The method of claim 2, wherein each of the half-length scalars has a bit length less than or equal to $\lceil t/2 \rceil$.

4. The method of claim 1, wherein verifying the digital signature provides verification that the implicit certificate is valid.

5. The method of claim 1, further comprising, prior to accessing the digital signature associated with the entity:
   computing the second elliptic curve point $C_1=2^{\lceil t/2 \rceil}C$;
   computing the third elliptic curve point $G_1=2^{\lceil t/2 \rceil}G$; and
   storing the second elliptic curve point $C_1$ and the third elliptic curve point $G_1$ for subsequent access.

6. A computing device comprising:
   one or more hardware processors configured to:
   access a digital signature associated with an entity, wherein the digital signature includes a first signature element r and a second signature element s;
   access a message m associated with the digital signature (r,s);
   access an implicit certificate issued by a certificate authority and associated with the entity, the implicit certificate including a first elliptic curve point P representing a public key reconstruction value of the entity;

access a second elliptic curve point $C_1$ representing a pre-computed multiple of a public key C of the certificate authority;

access a third elliptic curve point $G_1$ representing a pre-computed multiple of a generator point G, the generator point G representing a generator of an elliptic curve group of order n;

obtain a fourth elliptic curve point R based on the first signature element r;

compute a first integer u and a second integer v based on the digital signature, wherein the first integer u and the second integer v are each less than $\sqrt{n}$;

compute a hash h of the message m;

compute a third integer $\lambda_0$ and a fourth integer $\lambda_1$ such that $\lambda=\lambda_0+\lambda_1 2^{\lceil t/2 \rceil}$, where $t=\lceil \log_2(n+1) \rceil$, $\lambda=hv/s$;

compute a fifth integer $\gamma_0$ and a sixth integer $\gamma_1$ such that $\gamma=\gamma_0+\gamma_1 2^{\lceil t/2 \rceil}$, where $\gamma=vr/s$;

verify that $\lambda_0 G + \lambda_1 G_1 + \gamma_0 C + \gamma_1 C_1 + uP - vR = \mathcal{O}$ to verify the digital signature, where $\mathcal{O}$ represents an identity element of the elliptic curve group.

7. The computing device of claim 6, further comprising one or more memory components, wherein the one or more processors are configured to access the second elliptic curve point from the one or more memory components.

8. The computing device of claim 6, further comprising one or more communication interface components, wherein the implicit certificate and the digital signature are received by the one or more communication interface components from another computing device.

9. The computing device of claim 6, wherein the one or more processors are configured to:

generate a plurality of scalar multiples based on a plurality of half-length scalars and a plurality of elliptic curve points, wherein each of the scalar multiples is generated by multiplying one of the plurality of half-length scalars by one of the plurality of elliptic curve points, and the plurality of elliptic curve points includes the first elliptic curve point P and the second elliptic curve point $C_1$, wherein verifying the digital signature includes combining the plurality of scalar multiples according to a digital signature verification equation.

10. The computing device of claim 9, wherein each of the half-length scalars has a bit length less than or equal to t/2.

11. The computing device of claim 6, wherein verifying the digital signature provides verification that the implicit certificate is valid.

12. A non-transitory computer-readable medium storing instructions that are operable when executed by data processing apparatus to perform operations for verifying a digital signature, the operations comprising:

accessing a digital signature associated with an entity, wherein the digital signature includes a first signature element r and a second signature element s;

accessing a message m associated with the digital signature (r,s);

accessing an implicit certificate issued by a certificate authority and associated with the entity, the implicit certificate including a first elliptic curve point P representing a public key reconstruction value of the entity;

accessing a second elliptic curve point $C_1$ representing a pre-computed multiple of a public key C of the certificate authority;

accessing a third elliptic curve point $G_1$ representing a pre-computed multiple of a generator point G, the generator point G representing a generator of an elliptic curve group of order n;

obtaining a fourth elliptic curve point R based on the first signature element r;

computing a first integer u and a second integer v based on the digital signature, wherein the first integer u and the second integer v are each less than $\sqrt{n}$;

computing a hash h of the message m; computing a third integer $\lambda_0$ and a fourth integer $\lambda_1$ such that $\lambda=\lambda_0+\lambda_1 2^{\lceil t/2 \rceil}$, where $t=\lceil \log_2(n+1) \rceil$, $\lambda=hv/s$;

computing a fifth integer $\gamma_0$ and a sixth integer $\gamma_1$ such that $\gamma=\gamma_0+\gamma_1 2^{\lceil t/2 \rceil}$, where $\gamma=vr/s$;

verifying that $\lambda_0 G + \lambda_1 G_1 + \gamma_0 C + \gamma_1 C_1 + uP - vR = \mathcal{O}$ to verify the digital signature, where $\mathcal{O}$ represents an identity element of the elliptic curve group.

13. The computer-readable medium of claim 12, the operations comprising:

generating a plurality of scalar multiples based on a plurality of half-length scalars and a plurality of elliptic curve points, wherein each of the scalar multiples is generated by multiplying one of the plurality of half-length scalars by one of the plurality of elliptic curve points, and the plurality of elliptic curve points includes the first elliptic curve point and the second elliptic curve point, wherein verifying the digital signature includes combining the plurality of scalar multiples according to a digital signature verification equation.

14. The computer-readable medium of claim 13, wherein each of the half-length scalars has a bit length less than or equal to t/2.

15. The computer-readable medium of claim 12, wherein verifying the digital signature provides verification that the implicit certificate is valid.

16. The computer-readable medium of claim 12, the operations further comprising, prior to accessing the digital signature associated with the entity:

computing the second elliptic curve point; and storing the second elliptic curve point for subsequent access.

17. The method of claim 1, wherein verifying the digital signature includes combining the second elliptic curve point $C_1$ with a first half-length scalar, and combining the public key C of the certificate authority with a second half-length scalar, and the first and second half-length scalars are computed based on the digital signature.

* * * * *